United States Patent
Timonen et al.

(10) Patent No.: US 6,643,513 B2
(45) Date of Patent: Nov. 4, 2003

(54) METHOD AND APPARATUS FOR PROVIDING IMMEDIATE CIPHERING AFTER AN INTER-SYSTEM UTRAN-GSM HANDOVER

(75) Inventors: Juha T. Timonen, Finland (FI); Pasi P. Laitinen, Finland (FI)

(73) Assignee: Nokia Corporation, Espoo (FI)

( * ) Notice: Subject to any disclaimer, the term of this patent is extended or adjusted under 35 U.S.C. 154(b) by 9 days.

(21) Appl. No.: 10/241,276

(22) Filed: Sep. 10, 2002

(65) Prior Publication Data

US 2003/0092445 A1 May 15, 2003

Related U.S. Application Data

(60) Provisional application No. 60/336,510, filed on Nov. 15, 2001.

(51) Int. Cl.[7] .................................................. H04Q 7/20
(52) U.S. Cl. ........................ 455/438; 455/436; 455/437; 380/247
(58) Field of Search ................................ 455/436, 437, 455/438; 380/247

(56) References Cited

U.S. PATENT DOCUMENTS

2002/0025820 A1 * 2/2002 Fauconnier et al. ........ 455/452
2002/0066011 A1 * 5/2002 Vialen et al. ............... 713/150
2002/0191556 A1 * 12/2002 Krishnarajah et al. ...... 370/329

* cited by examiner

Primary Examiner—Nguyen T. Vo
Assistant Examiner—James K Moore
(74) Attorney, Agent, or Firm—Harrington & Smith, LLP

(57) ABSTRACT

Disclosed is a method for performing an inter-system handover. The method triggers the handover of a mobile station (100) from a UTRAN system to a GSM system by sending a HANDOVER FROM UTRAN COMMAND message from the UTRAN system. For the case where a HANDOVER COMMAND is sent transparently with the HANDOVER FROM UTRAN COMMAND, where the HANDOVER COMMAND has an information element set for indicating that ciphering is to be started, the method begins data ciphering immediately after handing over to the GSM system such that the first data frame transmitted by the mobile station in the GSM system is a ciphered data frame. For the case where there is a pre-existing UTRAN system ciphered data connection when the HANDOVER FROM UTRAN COMMAND message is received, the method continues without interruption the use of data ciphering with the data connection after handing over to the GSM system.

12 Claims, 6 Drawing Sheets

METHOD AND APPARATUS FOR PROVIDING IMMEDIATE CIPHERING AFTER AN INTER-SYSTEM UTRAN-GSM HANDOVER

CLAIM OF PRIORITY FROM A COPENDING PROVISIONAL PATENT APPLICATION

This patent application claims priority under 35 U.S.C. §119(e) from Provisional Patent Application No.: 60/336,510, filed Nov. 15, 2001, the content of which is incorporated by reference herein in its entirety. It is noted that references in this patent application to the "current" specification or version of a specification mean the specification as written at the time of filing the Provisional Patent Application No.: 60/336,510.

TECHNICAL FIELD

These teachings relate generally to wireless communications systems and methods and, more specifically, relate to cellular wireless communications systems and to techniques for a mobile station (MS), also referred to herein as user equipment (UE), to transition from one cell to another.

BACKGROUND

The following abbreviations are herewith defined, at least some of which are referred to in the ensuing description of the prior art and the preferred embodiments.

| | |
|---|---|
| 3GPP | Third Generation Partnership Project |
| BSC | Base Station Controller |
| BSS | Base Station System |
| BTS | Base Transceiver Station |
| CN | Core Network |
| CRS | Cell Re-Selection |
| CS | Cellular System |
| DL | Down Link (to the MS) |
| EDGE | Enhanced Data rate for Global Evolution |
| EGPRS | Enhanced General Packet Radio Service |
| GERAN | GSM/EDGE Radio Access Network |
| GPRS | General Packet Radio Service |
| GMM | GPRS Mobility Management |
| GSM | Global System for Mobile Communications |
| GSN | GPRS Support Node |
| HO | Handover |
| IE | Information Element |
| MAC | Medium Access Control |
| MS | Mobile Station, also referred to herein as User Equipment (UE) |
| MSC | Mobile Switching Center |
| RLC | Radio Link Control |
| RNC | Radio Network Controller |
| RR | Radio Resources |
| RRC | Radio Resource Control |
| SGSN | Serving GPRS Support Node |
| TBF | Temporary Block Flow |
| UL | Uplink (from the MS) |
| UMTS | Universal Mobile Telecommunications System |
| URA | User (or UTRAN) Registration Area |
| UTRAN | Universal Terrestrial Radio Network |

Reference can also be made to 3GPP TR 21.905, V4.4.0 (2001–10), Third Generation Partnership Project; Technical Specification Group Services and System Aspects; Vocabulary for 3GPP Specifications (Release 4), as well as to ETSI TR 101 748, V8.0.0 (2000–05), Digital cellular telecommunications system (Phase 2+); Abbreviations and acronyms (GSM 01.04 version 8.0.0 release 1999).

By way of introduction, reference is made to FIG. 1 for the ensuing description of a conventional inter-system handover from UTRAN to GSM. The UE 1 receives the GSM neighbor cell parameters from the RNC of the UTRAN 3 either in a SYSTEM INFORMATION BLOCK or in a MEASUREMENT CONTROL message. These parameters are required in order to be able to measure candidate GSM cells. Based on the measurement report from the UE 1, including GSM measurements, the RNC of the UTRAN 3 makes a handover decision. After resources have been reserved from the GSM BSS 2, via MSC 4, the RNC 3 sends an Inter-System Handover Command message (now also referred to as a HANDOVER FROM UTRAN COMMAND, as shown in FIG. 2), that also carries an embedded HANDOVER COMMAND of the GSM system. At this point, the GSM RR protocol in the UE 1 takes control and sends a GSM-specific HANDOVER ACCESS message to the GSM BSC. After a successful completion of the handover procedure, the GSM BSS 2 initiates resource release from the UTRAN 3. In response, the UTRAN 3 releases the radio connection and removes all context information for the UE 1.

Referring to FIG. 2, a more detailed description of the inter-system UTRAN to GSM handover is now provided, as specified in 3GPP TS 25.303, chapter 6.4.11. For CS domain services the UTRAN to GSM inter-RAT Handover procedure is based on measurement reports from the UE 1, but initiated from the UTRAN 3. A HANDOVER FROM UTRAN COMMAND is sent using acknowledged data transfer on the Dedicated Control Channel (DCCH). The UE transition from the UTRAN Connected Mode starts when the HANDOVER FROM UTRAN COMMAND is received. The transition to the GSM Dedicated mode, which may also be referred to as the GSM Connected mode, is finished when the HANDOVER COMPLETE message is sent from the UE 1.

The UTRAN 3 sends a RELOCATION REQUIRED to the CN/AS. This message contains information needed for the GSM system to be able to perform a handover (e.g. serving cell, target cell). Some parts of this information (e.g., MS classmark) are obtained at the setup of the RRC Connection and are stored in the CN.

The CN/AS sends a HANDOVER REQUEST message to BSC-RR 2 allocating the necessary resources to be able to receive the GSM UE 1, and acknowledges this by sending HANDOVER REQUEST ACKNOWLEDGE to the CN/AS. The HANDOVER REQUEST ACKNOWLEDGE contains a GSM-RR message (HANDOVER COMMAND) with all radio-related information that the UE 1 requires for the handover.

The CN/AS then sends a RELOCATION COMMAND (type UTRAN-to-BSS HARD HANDOVER) to the UTRAN 3 to start the execution of the handover. This message contains a GSM-RR message (HANDOVER COMMAND) with all the information needed for the UE 1 to be able to switch to the GSM cell and perform a handover to GSM.

Upon receipt of the HANDOVER FROM UTRAN COMMAND message in the UE 1, the UE-RRC entity forwards the GSM-RR message (HANDOVER COMMAND) to the MS-RR entity. To release the UTRAN resources the MS-RR entity requests the UE-RRC entity to release the RRC connection locally. The UE-RRC entity then locally releases the resources on the RLC, MAC and physical layers of the UE 1.

After having switched to the assigned GSM channel received in the HANDOVER FROM UTRAN COMMAND, the GSM MS sends HANDOVER ACCESS in successive layer 1 frames, just as it typically would have done for a conventional GSM handover initiation.

When the BSC-RR 3 has received the HANDOVER ACCESS it indicates this to the CN/AS by sending a HANDOVER DETECT message. The BSC-RR sends a PHYSICAL INFORMATION message to the GSM MS in unacknowledged mode that contains various fields of physical layer-related information allowing a proper transmission by the MS.

After layer 1 and 2 connections are successfully established, the GSM MS returns the HANDOVER COMPLETE message. The CN/AS is then able to release the UTRAN resources that were used for the UE 1 in the UTRAN Connected Mode. The CN/AS send an IU RELEASE COMMAND to the UTRAN, after which UTRAN can release all network resources from the RLC, MAC and the physical layer. When the release operation is complete, a IU RELEASE COMPLETE message is sent to the CN/AS.

The 3GPP 33.102 specification introduces the UMTS security context. The UMTS security context is used in the Release 1999 (R99) and later UMTS and GSM system releases. Chapter 4.3.2.a of 3GPP 24.008 describes a technique whereby ciphering keys for both GSM and UMTS systems are calculated during authentication. Authentication in the UMTS system guarantees the presence of ciphering keys for both systems.

The inter-system handover (HO) between two cellular system is described in 3GPP 25.331, 04.18 and 05.08 specifications, and in 3GPP 25.303. chapter 6.4.11, Inter-RAT Handover: UTRAN to GSM/BSS, CS domain services. The GSM-RR message that is discussed in the specification 3GPP 04.18, chapter 9.1.15 is the HANDOVER COMMAND. This command is delivered within the HANDOVER FROM UTRAN COMMAND, as is discussed in 3GPP 25.331, chapter 10.2.15.

In the UMTS to GSM inter-system handover the radio system changes from the UMTS radio system to the GSM radio system while an already established user data connection or link, such as a voice data or a circuit-switched data connection, continues after the handover. During this type of inter-system handover it is important that data ciphering or encryption continues uninterrupted in order to guarantee the security goals of 3GPP 33.102. In order for this to occur the GSM ciphering must begin immediately with the first transmitted data frame when handing over to the GSM system. However, the inventors have realized that the specification 3GPP 04.18, as currently written, makes it impossible to immediately initiate the use of GSM ciphering during an inter-system handover to the GSM system.

More specifically, 3GPP 04.18, chapter 3.4.4.1, states in part:

Optionally a cipher mode setting. In that case, this ciphering mode has to be applied on the new channel. If no such information is present, the ciphering mode is the same as on the previous channel. In either case the ciphering key shall not be changed. The HANDOVER COMMAND message shall not contain a cipher mode setting IE that indicates "start ciphering" unless a CIPHERING MODE COMMAND message has been transmitted previously in this instance of the dedicated mode: if such a HANDOVER COMMAND message is received it shall be regarded as erroneous, a HANDOVER FAILURE message with cause "Protocol error unspecified" shall be returned immediately, and no further action taken. In the case of UTRAN to GSM handover, the HANDOVER COMMAND message, which is sent transparently via RNC from BSS to the mobile station, shall always contain the cipher mode setting IE. In the case of CDMA2000 to GSM handover, the HANDOVER COMMAND message, which is sent transparently via RNC from BSS to the mobile station, shall always contain the cipher mode setting IE.

That is, the GSM system does not permit the use of ciphering without first receiving a CIPHERING MODE COMMAND. However, the CIPHERING MODE COMMAND cannot be sent before the HANDOVER COMMAND, as no GSM connection yet exists.

Stated another way, in the case where there is an inter-system handover from UTRAN to GSM, it is not possible to send any commands before the HANDOVER COMMAND, as no GSM connection exists prior to the HANDOVER COMMAND. This being the case, ciphering cannot continue in an uninterrupted fashion during the inter-system handover to GSM, and the potential thus exists for a third party to receive a voice or data transmission that is being sent unciphered.

It is noted that it is possible to send other commands within the UTRAN specific messages. At first glance it might appear that one could readily send both the CIPHERING MODE COMMAND and the HANDOVER COMMAND transparently. However, this would be a complex approach, and would also require that a significant amount of changes be made to the specification and to the network.

It should further be noted that the current specification states that in case of a UTRAN to GSM handover the HANDOVER COMMAND shall always contain the cipher mode setting IE, but at the same time it is said that IE shall not contain a "start ciphering" indication.

SUMMARY OF THE PREFERRED EMBODIMENTS

The foregoing and other problems are overcome, and other advantages are realized, in accordance with the presently preferred embodiments of these teachings.

Disclosed is a mobile station and a mobile station executed method for handing over from a current system to a target system. The method includes triggering the handover of the mobile station from the current system to the target system by receiving a current system-specific handover command from the current system, where the target system is one that requires the mobile station to initiate the use of data ciphering oil in response to receiving a specific command from the target system to initiate the use of data ciphering. A further step starts the use of data ciphering after handing over to the target system in response to receiving a target system-specific handover command that was sent transparently to the mobile station with the current system-specific handover command, where the target system-specific handover command has an information element set for indicating that ciphering is to be started. In the preferred embodiment the current system-specific handover command is a HANDOVER FROM UTRAN COMMAND, and the target system-specific handover command is a HANDOVER COMMAND with a cipher mode settings IE that indicates "start ciphering".

Stated another way, what is disclosed is a method for performing an inter-system handover. The method triggers the handover of the mobile station from a UTRAN system to a GSM system by sending a HANDOVER FROM UTRAN COMMAND message from the UTRAN system and, for the case where a HANDOVER COMMAND is sent transparently with the HANDOVER FROM UTRAN COMMAND, where the HANDOVER COMMAND has a cipher mode settings information element set for indicating that ciphering is to be started, beginning data ciphering immediately after handing over to the GSM system such that the first data frame transmitted by the mobile station in the GSM system is a ciphered data frame. For the case where there is a pre-existing UTRAN system ciphered data connection when the HANDOVER FROM UTRAN COMMAND message is received, continuing without interruption the use of data ciphering with the data connection after handing over to the GSM system.

The use of the teachings of this invention does not require any modifications to be made to the presently specified HANDOVER COMMAND, and thus has a minimal impact on already defined messaging and signaling formats and protocols.

BRIEF DESCRIPTION OF THE DRAWINGS

The foregoing and other aspects of these teachings are made more evident in the following Detailed Description of the Preferred Embodiments, which read in conjunction with the attached Drawing Figures, wherein.

DETAILED DESCRIPTION OF THE PREFERRED EMBODIMENTS

Figure 1:
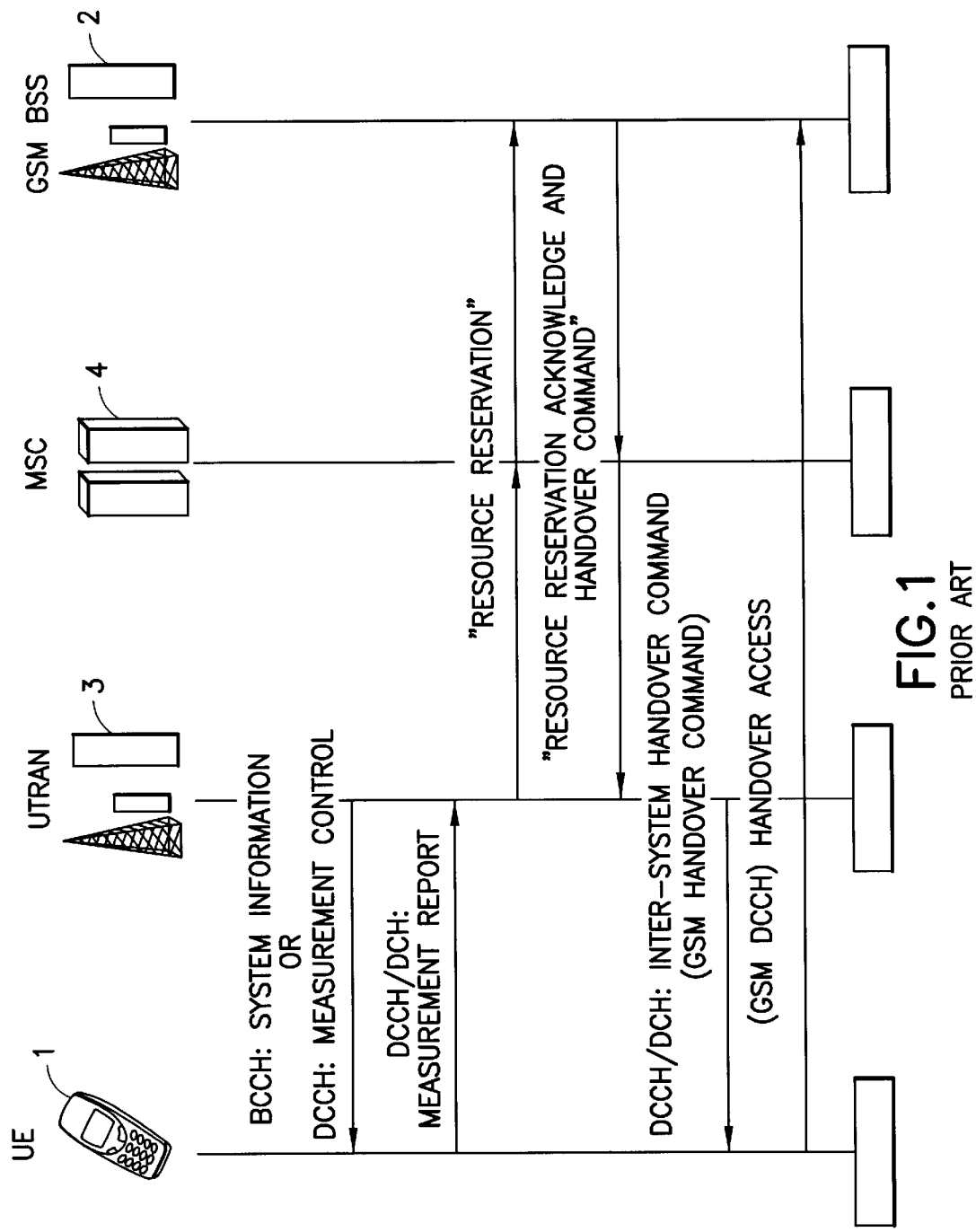
FIG. 1 is simplified process flow diagram for an inter-system UTRAN to GSM handover.
Figures 2, 2A:
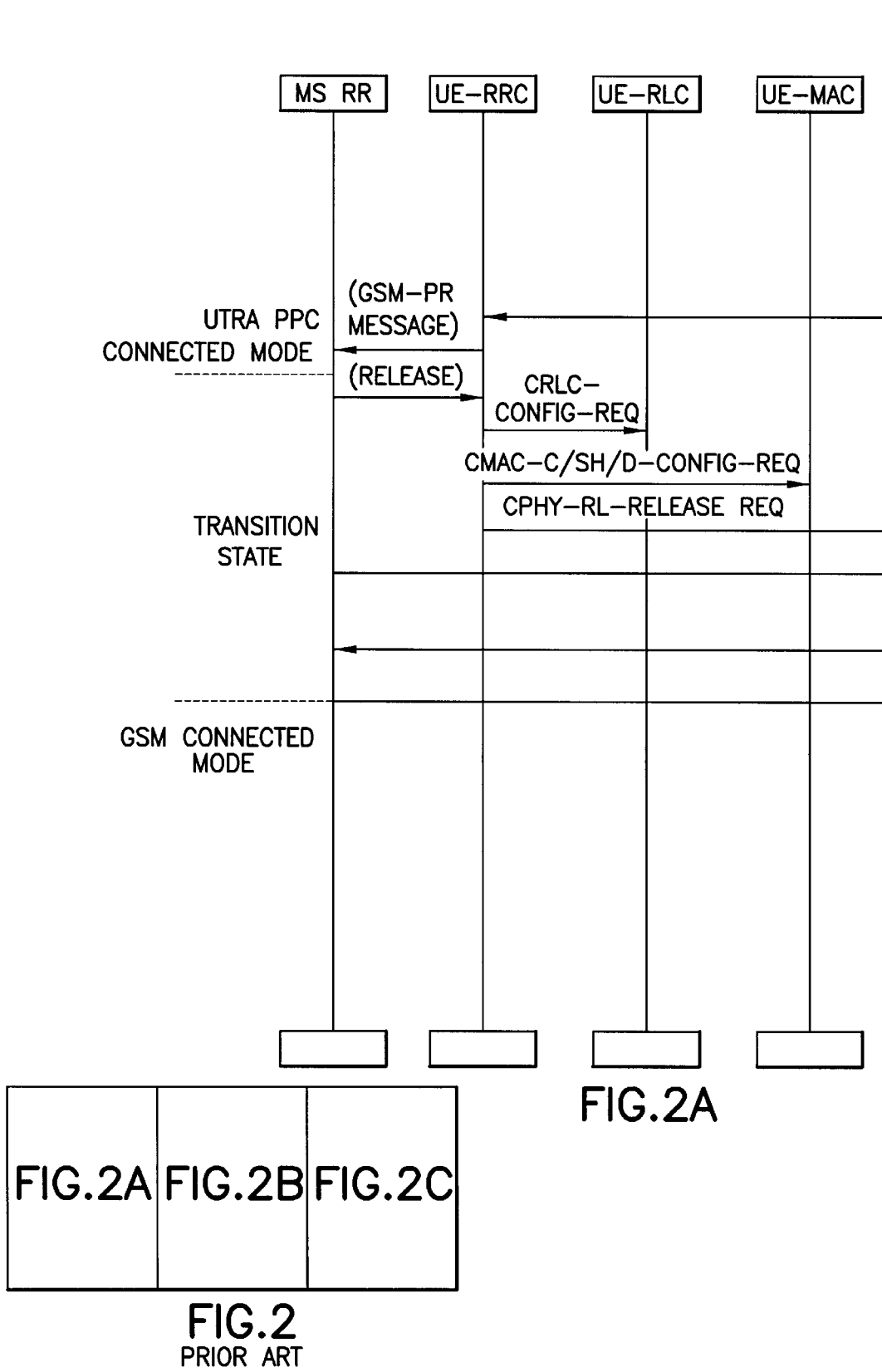
FIGS. 2A, 2B and 2C, collectively referred to as FIG. 2, are a more detailed process flow diagram of the inter-system UTRAN to GSM handover.
Figure 2B:
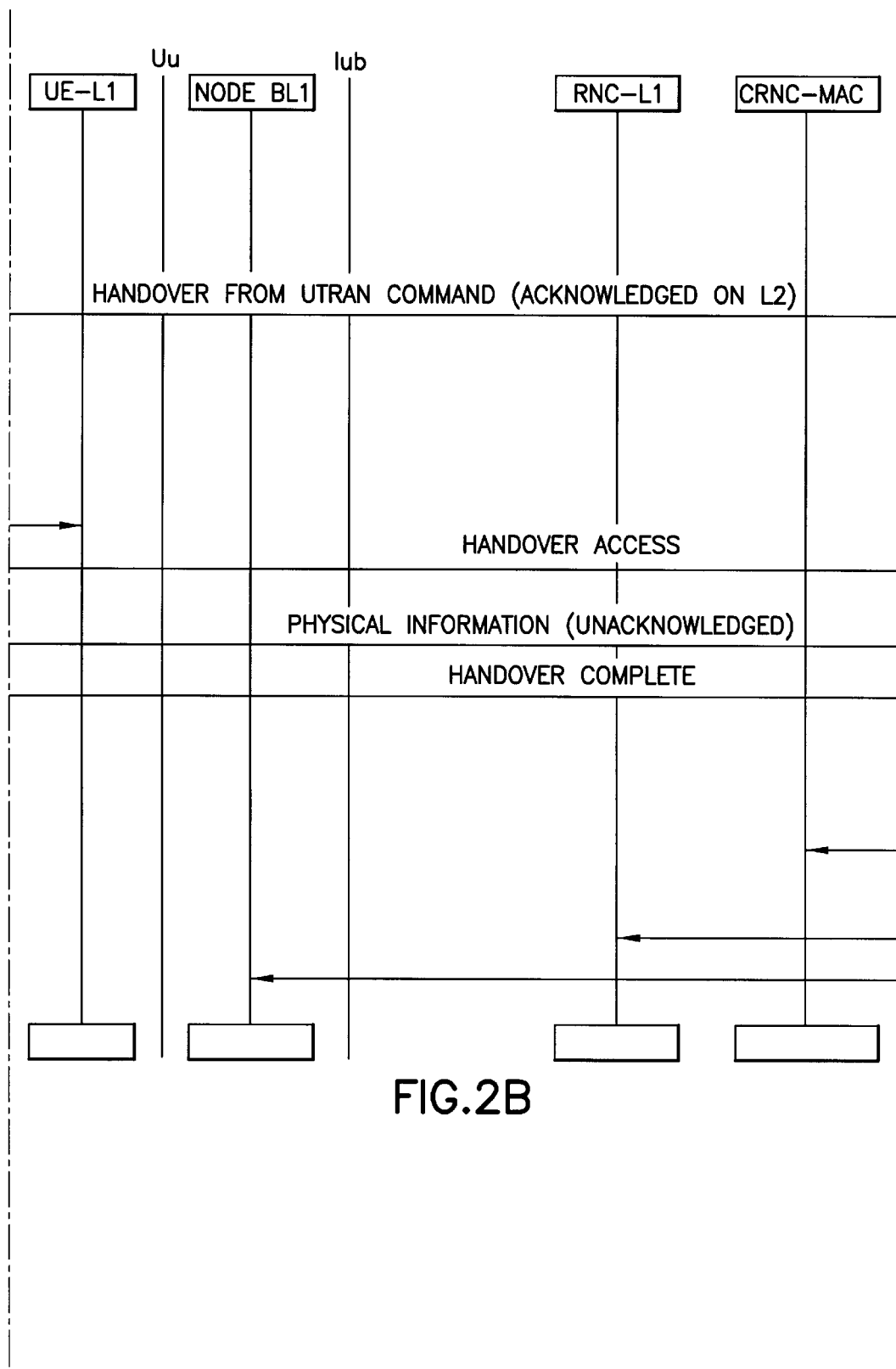
Figure 2C:
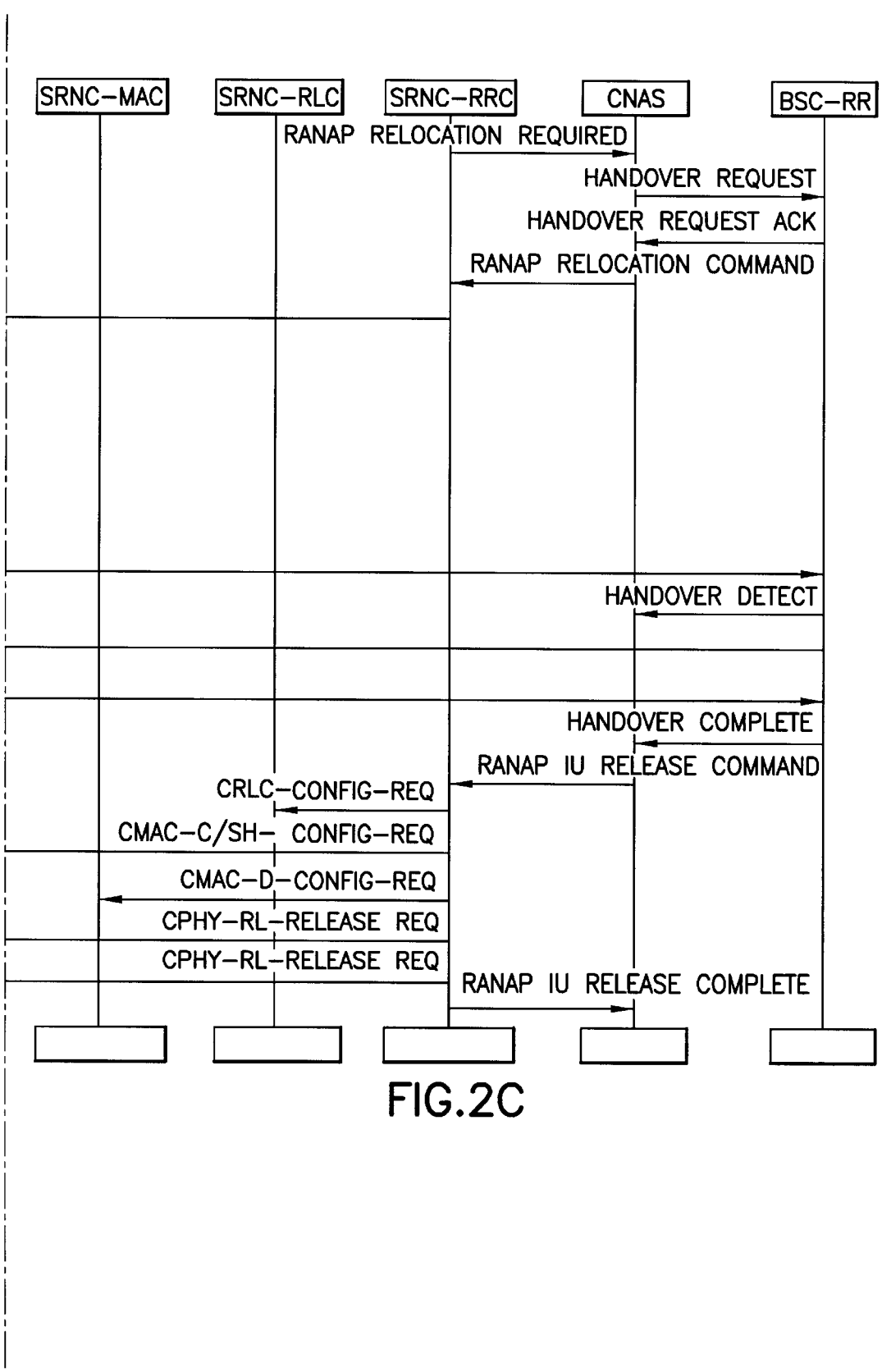
Figure 3:
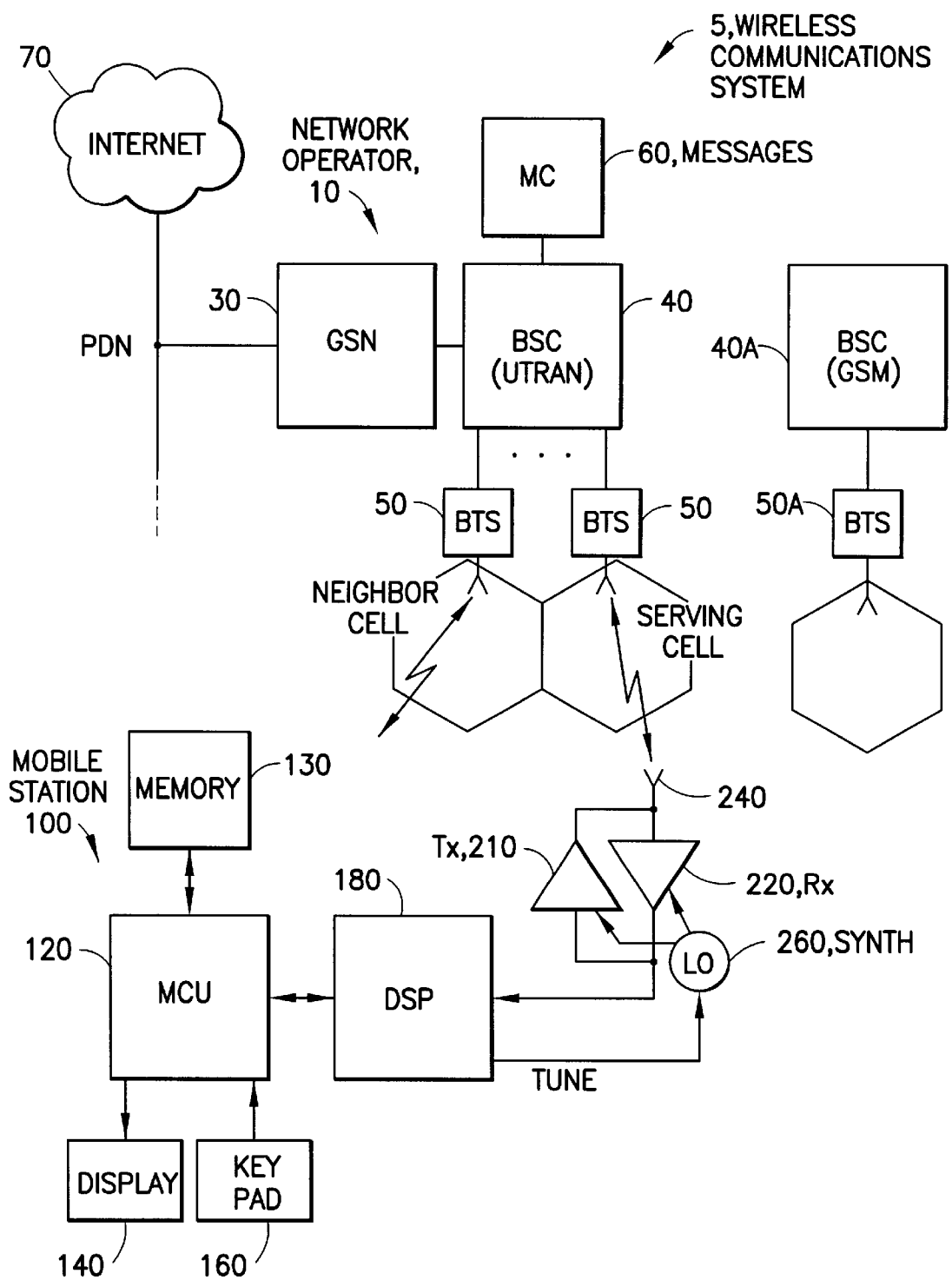
FIG. 3 is a simplified block diagram of an embodiment of a wireless communications system that is suitable for practicing this invention.

Referring to FIG. 3, there is illustrated a simplified block diagram of an embodiment of a wireless communications system 5 that is suitable for practicing this invention. The wireless communications system 5 includes at least one mobile station (MS) 100, also referred to herein as User Equipment (UE). FIG. 3 also shows an exemplary network operator having, for example, a Serving GPRS Support Node (SGSN) 30 for connecting to a telecommunications network, such as a Public Packet Data Network or PDN, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. The air interface standard can may enable both voice and data traffic, such as data traffic enabling Internet 70 access and web page downloads.

Each BTS 50 supports a cell, such as a serving cell that is currently servicing the MS 100, and at least one neighbor cell. In this exemplary system the BSC 40 and BTSs 50 are assumed to be associated with a UTRAN cellular system, while a second BSC 40A and at least one BTS 50A are assumed to be associated with a GSM cellular system. As such, a handover from the BTS 50 and BSC 40 to the BTS 50A and BSC 40A is an inter-system UTRAN to GSM handover.

The network operator may also include a suitable type of Message Center (MC) 60 that receives and forwards messages for the mobile stations 100. Other types of messaging service may include Supplementary Data Services and possibly Multimedia Messaging Service (MMS), wherein image messages, video messages, audio messages, text messages, executables and the like, and combinations thereof, can be transferred between the network and the mobile station 100.

The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The user equipment or mobile station 100 typically includes a data processor such as a microcontrol unit (MCU) 120 having an output coupled to an input of a display 140 and an input coupled to an output of a keyboard or keypad 160. The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the inter-system UTRAN to GSM handover, and related methods, in accordance with these teachings.

The ROM of the MS 100 also typically stores a program that provides a suitable user interface (UI), via display 140 and keypad 160. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

The ROM of the MS 100 is assumed to store a program that enables the MS 100 to receive and process a HANDOVER FROM UTRAN COMMAND message, as defined in 3GPP TS 25.331, v4.2.0, chapter 10.2.15. This message includes a number of information elements (IEs), shown in the following Table, and is used for handover of the MS 100 from UMTS to another system, such as to a GSM system. One or several messages from the other system can be included within the Inter-RAT message information element in this message. Note, for example, that one or a plurality of GSM messages can be embedded into this message, as could cdma2000 messages if handing off to a cdma2000 system. The other-system message or messages are structured and coded according to that systems' specification.

| Information Element/Group name | Need | Multi | Type and reference | Semantics description |
|---|---|---|---|---|
| Message Type | MP | | Message Type | |
| UE information elements | | | | |
| RRC transaction identifier | MP | | RRC transaction identifier 10 3 3.36 | |
| Integrity check info | CH | | Integrity check info 10 3.3.16 | |
| Activation time | MD | | Activation time 10 3 3.1 | Default value is "now" |
| RB information elements | | | | |
| RAB information list | OP | 1 to <max RABsetup> | | For each RAB to be handed over In this version, the maximum size of the list of 1 shall be applied for all system types |
| >RAB info | MP | | RAB info 10.3 4 8 | |
| Other information elements | | | | |
| CHOICE System type | MP | | | This IE indicates which specification to apply, to decode the transported messages |
| >GSM | | | | |
| >>Frequency band | MP | | Enumerated (GSM/DCS 1800 band used). GSM/PCS 1900 band used) | |
| >>GSM message | | | | |
| >>>Single GSM message | MP | | Bit string (no explicit size constraint) | Formatted and coded according to GSM specifications The first bit of the bit string contains the first bit of the GSM message. |
| >>>GSM message List | MP | 1.to.< maxInterSys Messages> | Bit string (1 . . . 512) | Formatted and coded according to GSM specifications. The first bit of the bit string contains the first bit of the GSM message. |
| >cdma2000 | | | | |
| >>cdma2000MessageList | MP | 1.to.< maxInterSys Messages> | | |
| >>>MSG_TYPE(s) | MP | | Bit string (8) | Formatted and coded according to cdma2000 specifications The MSG_TYPE bits are numbered b0 to b7, where b0 is the least significant bit. |
| >>>cdma2000Messagepayload(s) | MP | | Bit string (1 . . . 512) | Formatted and coded according to cdma2000 specifications The first bit of the bit string contains the first bit of the cdma2000 message. |

In accordance with the teachings of this invention, an exception is added to the currently specified procedure of 3GPP 04.18 to enable the MS 100 to immediately begin ciphering, when entering the GSM connected mode after handing over from a UTRAN system, without first having to receive a CIPHERING MODE COMMAND.

The preferred implementation of this invention is to change the above quoted 3GPP 04.18, chapter 3.4.4.1, so that it reads, in part (or can be interpreted to mean that):

The HANDOVER COMMAND message shall not contain a cipher mode setting IE that indicates "start ciphering" unless a CIPHERING MODE COMMAND message has been transmitted previously in this instance of the dedicated mode, or unless the HANDOVER COMMAND message is sent transparently via RNC from BSS to the mobile station (emphasis added).

As employed herein, the phrase "unless the HANDOVER COMMAND message is sent transparently" means that the GSM-specific HANDOVER COMMAND is sent from the BSC-RR entity to the UE-RR entity encapsulated within the UTRAN/UMTS-specific command (HANDOVER FROM UTRAN COMMAND). By so encapsulating the GSM-specific command the UTRAN network elements that handle the UTRAN/UMTS specific command need not handle or understand the encapsulated GSM-specific command, i.e., the GSM-specific command is "transparent" from the perspective of the UTRAN network.

The wireless network is assumed to include a suitable controller or control element(s) for causing the HANDOVER COMMAND message to be sent transparently to the mobile station 100, with the IE set for indicating "start ciphering".

In accordance with the conventional procedure discussed above, the HANDOVER COMMAND received with the cipher mode settings IE that indicated "start ciphering" would have been treated as an error condition and ignored. The teachings of this invention overcome this problem by recognizing the reception of the HANDOVER COMMAND with the cipher mode settings IE that indicate "start ciphering", that is sent transparently with the UTRAN specific message, as a special case wherein the cipher mode settings IE that indicate "start ciphering" are to be interpreted and acted upon.

Figure 4:
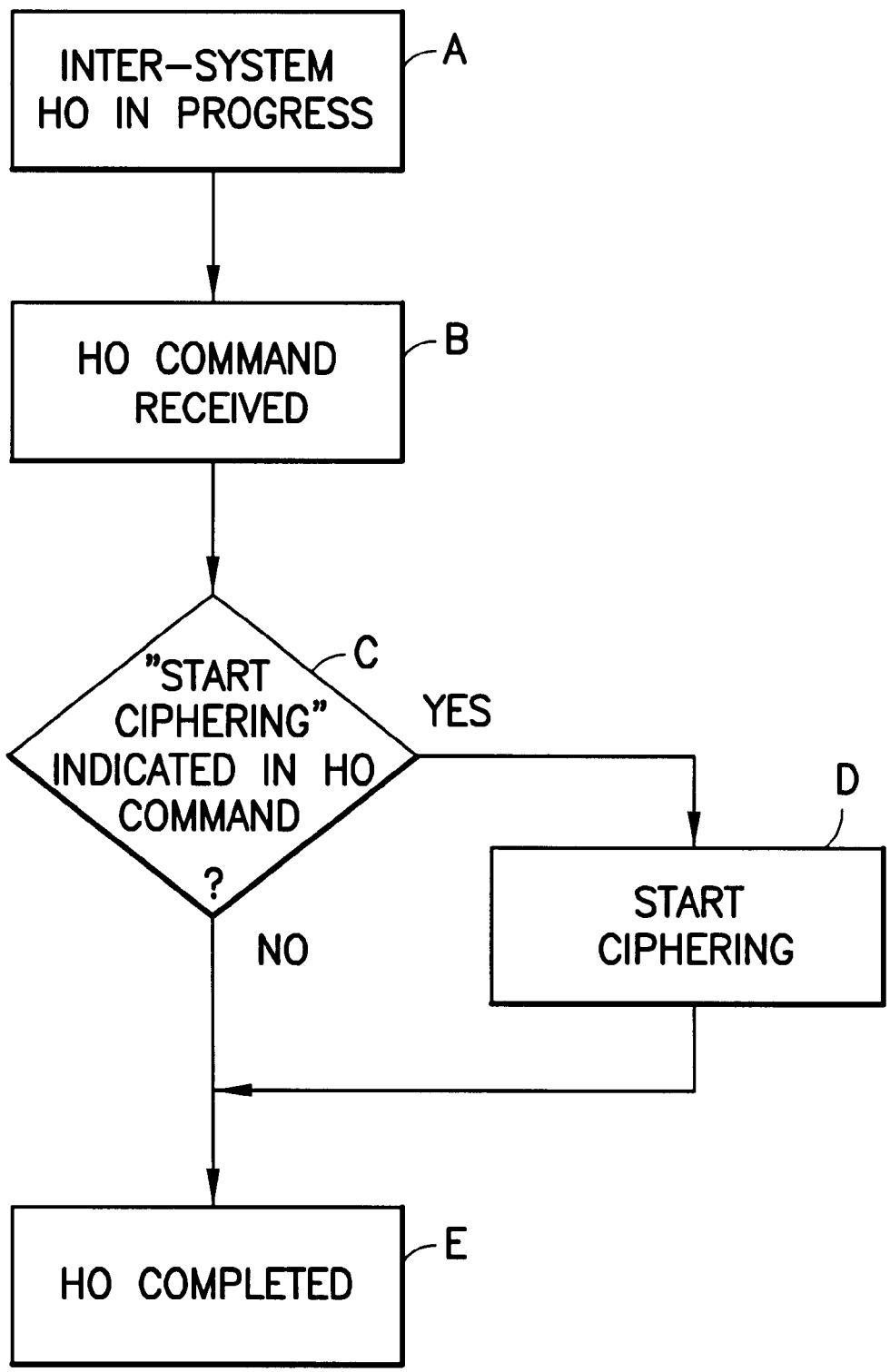
FIG. 4 is a logic flow diagram that is descriptive of a method in accordance with this invention.

Referring to FIG. 4, at Step A it is assumed that the MS 100 is in the process of executing an inter-system handover. In the preferred embodiment the inter-system handover is a UTRAN to GSM handover, but in other embodiments of this invention other types of system handovers could occur, so long as the system being handed over to is one that does not permit the use of ciphering without the MS 100 receiving a command that expressly instructs the MS 100 to begin the use of ciphering.

At Step B a determination is made if the HANDOVER COMMAND has been received transparently, as described above. Assuming that it has, at Step C a determination is made if the transparently received HANDOVER COMMAND has an IE that indicates that ciphering should be started. If it does, control passes to Step D to start ciphering, and then to Step E to terminate the HANDOVER COMMAND processing, else control passes from Step C to Step E to terminate the HANDOVER COMMAND processing.

The tests made at Steps B and C can be made by the MCU 120 checking the state of appropriate software flags stored in a register or in the memory 130.

The end result is that ciphering may be started whether or not ciphering was in effect when the inter-system handover was initiated. If ciphering was already in effect, as will typically be the case in the UTRAN system, then ciphering continues without interruption in the GSM system when performing the inter-system handover. If ciphering was not in effect in the UTRAN system, then it can be started immediately in the GSM system after the handover by programming the cipher mode setting IE appropriately in the GSM-specific HANDOVER COMMAND message that is sent transparently to the MS 100.

While described in the context of various specific messages a functions, those having skill in the art should appreciate that the teachings of this invention are not intended to be limited to only the presently preferred embodiments. The foregoing method is applicable to a number of wireless networks that allow user mobility, as well as an ability for the user to transition between different types of systems. The disclosed method clearly improves the UTRAN to GSM inter-system handover procedure by preserving the immediate use of ciphering after the handover, as well as conserving network resources by not requiring that additional messages be sent. While the disclosed method is especially applicable for the UTRAN to GSM handover situation, it is not limited for use with only these network types.

What is claimed is:

1. A mobile station executed method for handing over from a current system to a target system, comprising:

triggering the handover of the mobile station from the current system to the target system by receiving a current system-specific handover command from the current system, where the target system is one that requires the mobile station to initiate the use of ciphering only in response to receiving a specific command from the target system to initiate the use of ciphering; and starting the use of ciphering after handing over to the target system in response to receiving a target system-specific handover command that is sent transparently with the current system-specific handover command, where the target system-specific handover command has an information element set for indicating that ciphering is to be started.

2. A method as in claim 1, wherein the target system is a GSM system.

3. A method as in claim 1, wherein the current system is a UTRAN system.

4. A method as in claim 1, wherein the current system-specific handover command is a HANDOVER FROM UTRAN COMMAND, and where the target system-specific handover command is a HANDOVER COMMAND with a cipher mode settings information element that indicates "start ciphering".

5. A mobile station operable for being handed over from a current system to a target system, comprising an RF transceiver coupled to a data processor, said data processor being responsive to a receipt through said RF transceiver of a current system-specific handover command from the current system for triggering the handover of the mobile station from the current system to the target system, where the target system is one that requires the mobile station to initiate the use of ciphering only in response to receiving a specific command from the target system to initiate the use of ciphering, said data processor operating to immediately start the use of ciphering after handing over to the target system in response to receiving a target system-specific handover command that is sent transparently with the current system-specific handover command, where the target system-specific handover command has an information element set for indicating that ciphering is to be started.

6. A mobile station as in claim 5, wherein the target system is a GSM system.

7. A mobile station as in claim 5, wherein the current system is a UTRAN system.

8. A mobile station as in claim 5, wherein the current system-specific handover command is a HANDOVER FROM UTRAN COMMAND, and where the target system-specific handover command is a HANDOVER COMMAND with a cipher mode settings information element that indicates "start ciphering".

9. A method for performing an inter-system handover, comprising:

triggering the handover of the mobile station from a UTRAN system to a GSM system by sending a HANDOVER FROM UTRAN COMMAND message from the UTRAN system; and for the case where a HANDOVER COMMAND is sent transparently with the HANDOVER FROM UTRAN COMMAND, where the HANDOVER COMMAND has an information element set for indicating that ciphering is to be started, beginning ciphering immediately after handing over to the GSM system such that a first data frame transmitted by the mobile station in the GSM system is a ciphered data frame.

10. A method as in claim 9, where for the case where there is a pre-existing UTRAN system ciphered connection when the HANDOVER FROM UTRAN COMMAND message is received, continuing without interruption the use of ciphering with the connection after handing over to the GSM system.

11. A wireless mobile communications system operable for performing an inter-system handover, comprising:

wireless network means for triggering the handover of a mobile station from a UTRAN system to a GSM system by sending a predetermined command message from the UTRAN system, the predetermined command comprising a HANDOVER FROM UTRAN COMMAND message with a HANDOVER COMMAND that is sent transparently with the HANDOVER FROM UTRAN COMMAND, the HANDOVER COMMAND comprising an information element set for indicating that ciphering is to begin; and mobile station means, responsive to a receipt of the predetermined command, for beginning ciphering immediately after handing over to the GSM system.

12. A system as in claim 11, where for the case where there is a pre-existing UTRAN system ciphered connection when the HANDOVER FROM UTRAN COMMAND message is received, continuing without interruption the use of ciphering with the connection after handing over to the GSM system.

* * * * *